H. D. COOK.
SKELP CUPPING AND CLIPPING APPARATUS.
APPLICATION FILED OCT. 1, 1915.
1,267,379.
Patented May 28, 1918.
3 SHEETS—SHEET 2.
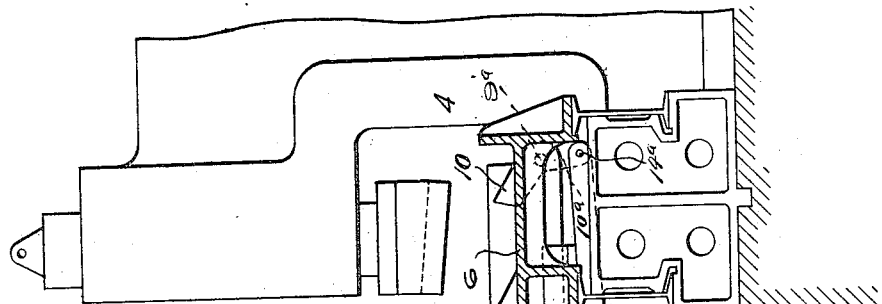
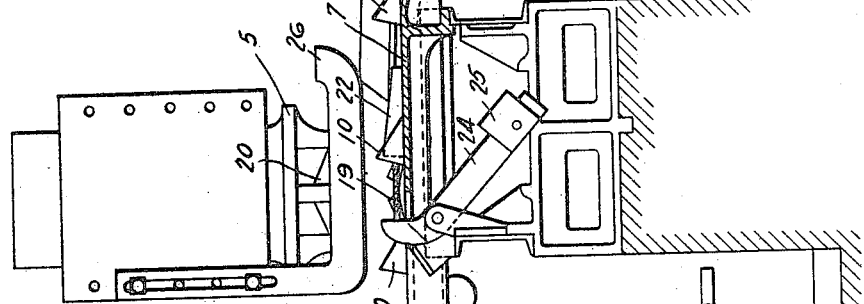
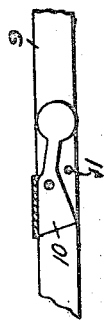
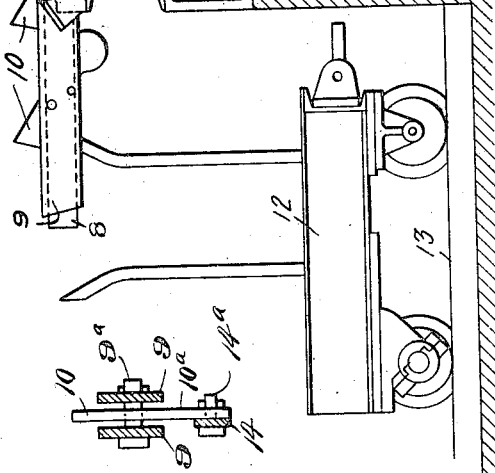
WITNESSES
INVENTOR

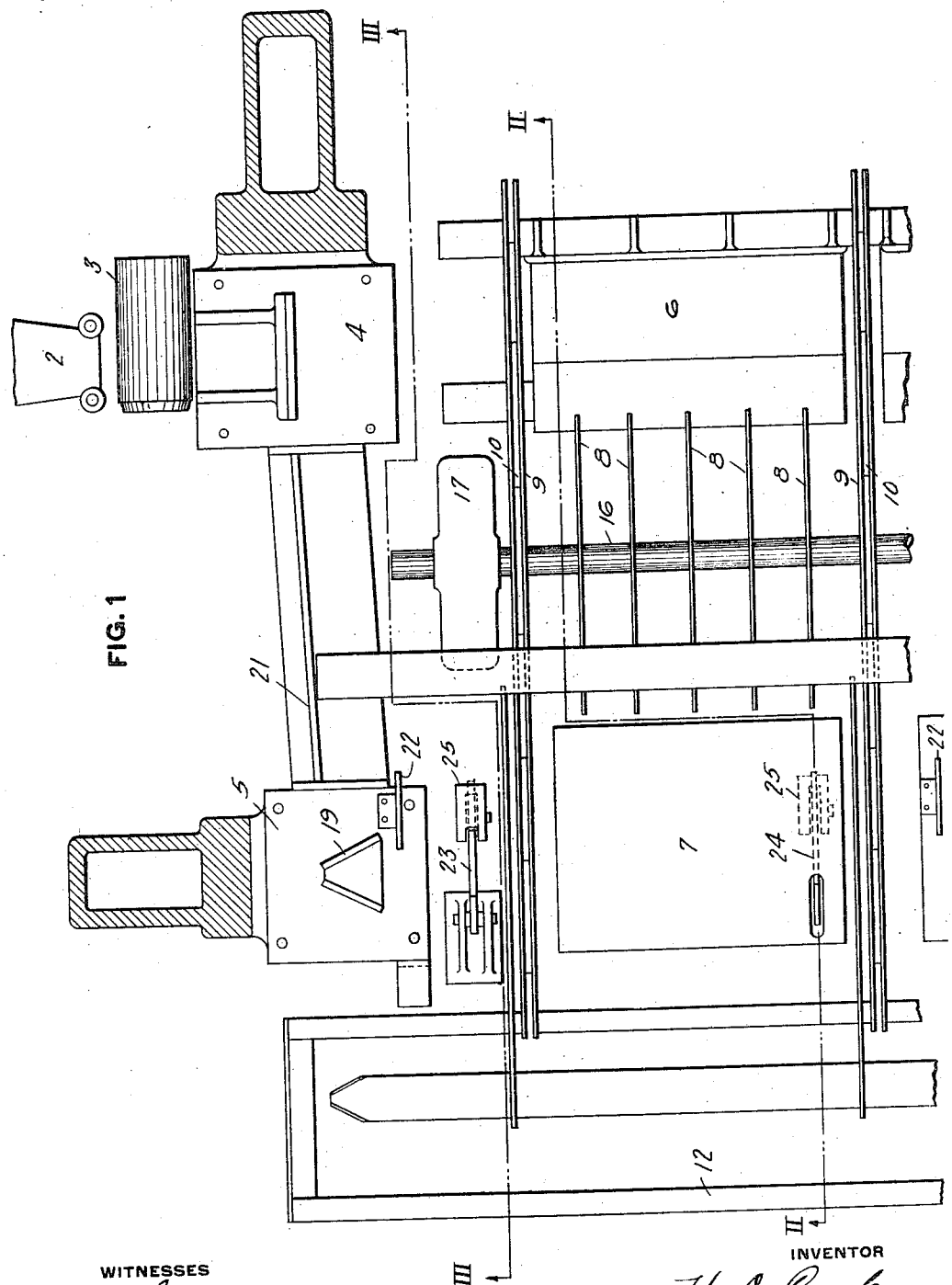

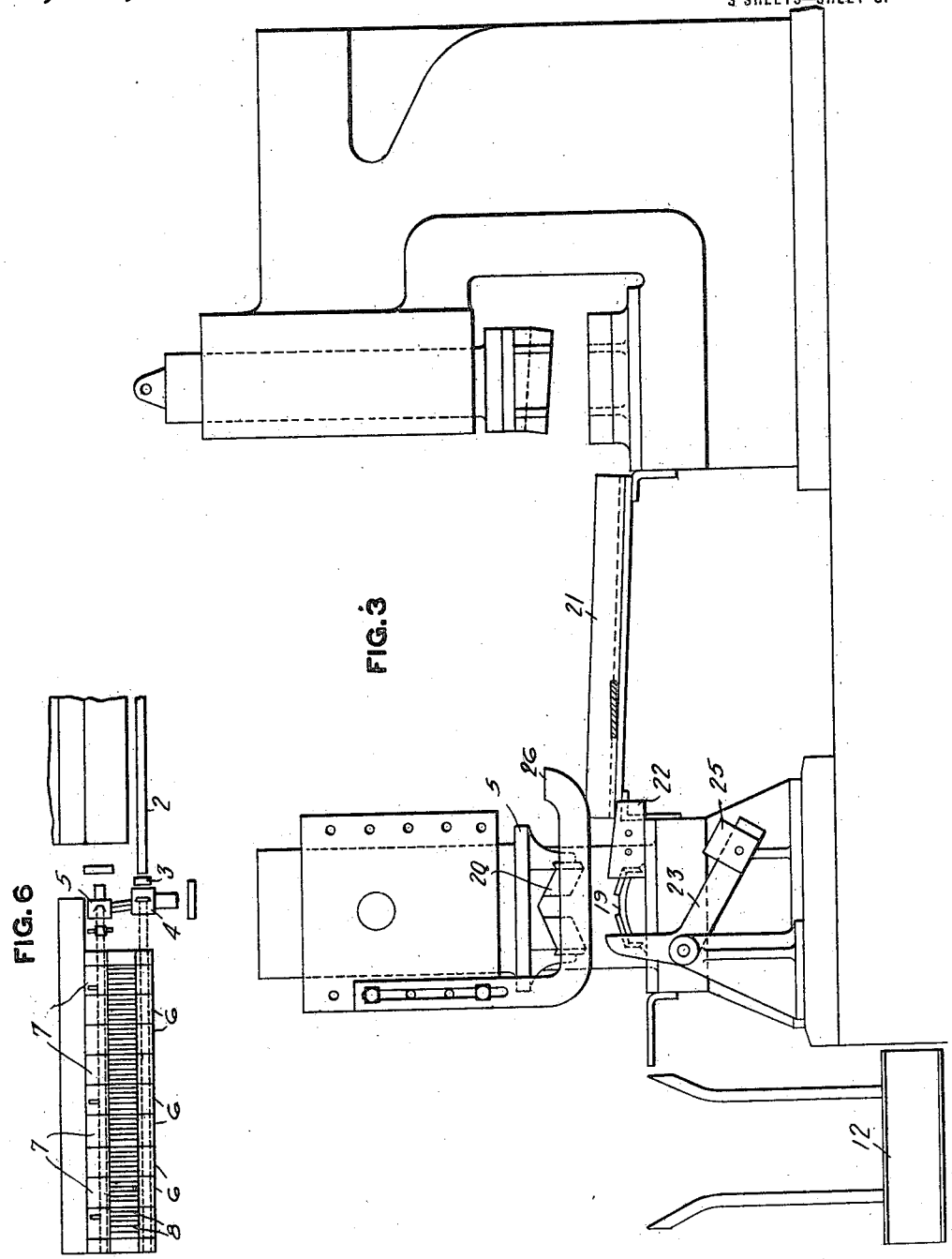

UNITED STATES PATENT OFFICE.

HOWARD D. COOK, OF LORAIN, OHIO.

SKELP CUPPING AND CLIPPING APPARATUS.

1,267,379.

Specification of Letters Patent.

Patented May 28, 1918.

Application filed October 1, 1915. Serial No. 53,534.

*To all whom it may concern:*

Be it known that I, HOWARD D. COOK, a citizen of the United States, and resident of Lorain, in the county of Lorain and State of Ohio, have invented certain new and useful Improvements in Skelp Cupping and Clipping Apparatus, of which the following is a specification.

My invention relates to apparatus for cupping and clipping the ends of pipe skelp in preparing the skelp for later heating and welding operations whereby the skelp are formed into buttweld pipes.

In making certain sizes or classes or buttweld pipes it has been found necessary or at least desirable to clip the corners from and cup the forward end of the skelp, (the end engaged by the tongs in welding) preparatory to heating and welding to facilitate the movement of the skelp within the heating furnace and the entry of the end of the skelp into the welding bell in the welding operation.

One object of my invention is to provide improved apparatus for cupping and clipping the corners from the ends of pipe skelp having novel means for shaping the skelp ends and for mechanically handling or manipulating the skelp, in positioning the skelp preparatory to the cupping and clipping operations, and in removing and piling the skelp after such cupping and clipping operations.

Another object of this invention is to provide cupping and clipping apparatus having improved means whereby the ends of a plurality of pipe skelp while piled one on another are simultaneously cupped and clipped and by which the pipe skelp are handled in a pile in transferring the skelp into and out of the cupping and clipping position.

Still further objects of the invention will become apparent as the invention is hereinafter more fully described and is pointed out in the appended claims.

Referring now to the drawings forming part of this specification, Figure 1 is a plan showing a preferred arrangement of apparatus for cupping and clipping pipe skelp and for automatically handling the materials, as constructed and arranged in accordance with my invention.

Fig. 2 is a sectional end elevation of the apparatus shown in Fig. 1, the section being taken on the line II—II of Fig. 1.

Fig. 3 is a sectional end elevation of the apparatus shown in Fig. 1, similar to that of Fig. 2, the section being taken on the line III—III of Fig. 1.

Fig. 4 is a sectional side elevation, showing a detail in the construction of the automatic skelp handling mechanism.

Fig. 5 is a sectional end elevation of the detail shown in Fig. 4.

Fig. 6 is a diagrammatic plan on a smaller scale showing the relative arrangement of the cropping shear, cupping and clipping shear, and skelp handling mechanism of Figs. 1, 2, and 3.

Fig. 7 is a sectional elevation showing details in the construction of the pivotal connection between the reciprocating skids and operating links of the transfer mechanism.

In the accompanying drawings, (see Figs. 1 and 6) the numeral 2 designates one end of a piling mechanism whereby a series of two or more multiple length skelp as received from the rolling mill are mechanically piled one on top of the other into position to be cropped and cut to length.

At the discharge end of the piling mechanism 2 is a pair of pinch rollers 3 of the usual construction by which the pile of skelp, (or a single skelp,) is transferred lengthwise between the knives of the end shear 4, in positioning the multiple length skelp or pile of skelp for cropping and cutting to length with the shear 4.

Located at one side of the end shear 4 is a second shear 5 by which the ends of the sheared skelp are cupped and clipped in preparing the skelp for the later heating and welding operations.

Positioned in front of the shear 4 and the cupping and clipping shear 5 is a transfer mechanism by which the skelp or piles of sheared skelp, as cut to length by the shear 4, are transferred sidewise into position between the dies of the cupping and clipping mechanism. As shown, this transfer mechanism comprises a series of apron plates 6 on the discharge side of the shear 4 and a series of apron plates 7 in front of the cupping mechanism with horizontal supports or skids 8 connecting the adjacent sides of the apron plates 6 and 7.

Also extending horizontally at each end of the apron plates, 6 and 7, is a series of parallel, lengthwise reciprocating bars or skids 9, 9, each having a series of pivoted dogs 10 at equally spaced intervals in the length thereof. The upper ends of the dogs 10 which are pivoted between pairs of the bars 9 are arranged to tilt downwardly when the bars are moved from left to right in Fig. 2, (see Figs. 4 and 5) and are held by pins 11 against tilting when moved in the opposite direction, the upper ends of these dogs engaging with the edges of the skelp or piles of skelp supported on the skids and, by a step by step movement, transferring the skelp or piles of skelp as successively cut by the end shear 4, across the width of the bed formed by the apron plates 6 and 7 and skids 8, until opposite the shear 5 in alined position for clipping and cupping the end of the skelp. The dogs 10 each have a tail forming a counterweight which yieldingly holds the upper end of the dogs in lifted position.

The reciprocating bars or skids 9, 9, also project beyond the side of the apron plates 7 so as to transfer the clipped and cupped skelp away from in front of the second or cupping and clipping shear 5 and discharge the cupped and clipped skelp upon the truck 12 positioned at one side of the transfer mechanism upon the depressed transfer track 13.

At the discharge side of the transfer mechanism formed by the skids 8 and 9 is a truck 12 having wheels by which the truck is mounted on the track rails 13. The truck 12 is positioned below the top of the skids 9 so as to receive and form a pile of the cupped and clipped skelp as the skelp delivered to the truck from the skids by the dogs 10 on the reciprocating bars 9.

The reciprocating bars 9 are pivotally connected through the tail of the dog 10 at one end of the reciprocatory bars or skids 9 by links 14 to the upper end of the rocking arms or levers 15 which are fastened at their lower ends to the rocking shaft 16 positioned beneath the skids, between the foundations or supports for the apron plates 6 and 7. Pins 9ª are employed to pivotally connect the dogs 10 to the bars 9 and a pivot pin 14ª connects the tail 10ª of one of the dogs 10 to one end of the links 14. The rocking shaft 16 is mounted in bearings 17, 17, and is connected in any desired manner to a suitable rocking mechanism (not shown).

The shear 5 forming the clipping and cupping mechanism is provided with a combination bottom knife and die 19 and a reciprocating combination upper knife and die 20 by which the corners are clipped off the ends of the pipe skelp and the clipped ends are bent or cupped to the desired contour.

Extending between the shear 4 and the cupping apparatus 5 and between the transfer mechanism and shears at an angle to the line of feed of the transfer mechanism, is an inclined guide 21 by which the skelp or piles of skelp while being transferred sidewise from the shear 4 to the cupping and clipping shear, are moved endwise, so that the sheared end or ends of the pipe skelp are positioned lengthwise between the clipping knives of the shear 5 when the skelp or pile of skelp reaches a position lengthwise in alinement with the center of the cupping mechanism, in position for cupping and clipping the ends of the skelp.

Stationary stops 22 having an inclined upper edge are secured on the base of the clipping and cupping shear 5 and in one or more of the apron plates 7 to position the skelp sidewise with respect to the shear 5, and pivoted arms 23 and 24 having counterweights 25 on one end are provided to engage the opposite side of the piled skelp and move the skelp backwardly into engagement with the stationary stops 22. The stops 22 are adjustably secured on the apron plates or other supports therefor, to permit of skelp of varying widths being alined relative to the cupping mechanism.

The arms 23 and 24 are pivoted in such manner as to permit the skelp to move forwardly and depress the projecting upper end of the arms after the clipping and cupping operation, so that the skelp may pass over the arms 23 and 24 when the reciprocating skids or bars 11 move the skelp forwardly from in front of the shear 5 toward the discharge side of the transfer mechanism.

To prevent lifting of the front end of the sheared skelp or the end which is to be cupped and clipped, a horizontally extending guide 26 is secured on the front of the shear 5 so as to extend above the pile of skelp and prevent lifting, while permitting the skelp to pass beneath the guide or stop, this guide being vertically adjustable to suit skelp or piles of skelp of varying thickness to be cupped and clipped.

In the operation of my improved apparatus the skelp as delivered lengthwise from the rolling mill, are mechanically piled by means of the piling mechanism 2, two or more skelp being placed one on top of the other in preparation for the cropping or end shearing and later cupping and clipping operations.

The so formed piles of skelp are then moved lengthwise by the pinch rollers 3, which are positively actuated, between the knives of the shear 4. The front end of the skelp or pile of skelp is cropped and the cropped pile is then moved lengthwise to form skelp of the desired length and the knives of the shear 4 are caused to approach and cut skelp of the desired length from the multiple length skelp.

The several portions of the skelp then rest upon the apron plate 6 and skids 9. The notched bars are then reciprocated, the dogs 10 engaging the sheared pile of skelp and moving it sidewise away from in front of the shear 4. The multiple length skelp is then again moved forwardly between the shear knives of the shear 4 and another section of the desired length is cut from the multiple length pile of skelp. When severed, such cut sections of skelp rest on the apron plate 6 and are engaged by another of the dogs 10 on the reciprocating bars 9 and are moved sidewise toward the cupping and clipping mechanism 5. The dogs 10 on the reciprocating bars 9 space the piles of sheared skelp and maintain the piles in spaced relation as they are moved transversely into position in front of the cupping mechanism 5. The guide 21 which extends at an angle to the line of transfer of the skelp, engages with the ends of the cut skelp and move the skelp lengthwise during the sidewise movement thereof, so that when the skelp reaches a position in line of the cupping and clipping knives of the shear 5 the skelp will be positioned endwise between the cupping and clipping knives. The skelp or piled skelp when moved sidewise over and past the fixed stops 22 are brought into engagement with the bent upper ends of the pivoted arms 23 and 24, and these arms, which are counterweighted, mechanically move the skelp sidewise in the opposite direction into engagement with the fixed stops 22. The reciprocating bars 9 are then moved backwardly and the skelp is then moved sidewise by these swinging counterweighted arms 23 and 24 so as to aline the skelp lengthwise relative to the cupping or clipping position of the cupping and clipping mechanism which is then caused to clip the corners from the end of the skelp and simultaneously bend or cup the clipped end of the skelp to the desired contour.

The clipped or cupped pile of skelp is then caused to advance and as it reaches a position at the end of the transfer mechanism from the transfer mechanism it falls by gravity upon the transfer car 12. The piles of cupped or clipped skelp are successively transferred to the car 12 and when filled this car is moved sidewise, from beneath the transfer mechanism into position to permit of the pile of clipped and cupped skelp to be removed from the transfer car by an overhead traveling crane or another lifting mechanism.

The above described operations are then repeated with successive skelp or piles of skelp in the manner which has been described.

The advantages of my invention will be apparent to those skilled in the art. Modifications in the construction and arrangement of the parts may be made with the description from the invention defined in the appended claims.

I claim:—

1. In apparatus for clipping and cupping pipe skelp, the combination of a shear having means for clipping and cupping the skelp, an alining mechanism whereby the skelp are held in alinement with said shear, means for moving the skelp into alined position and a transfer mechanism whereby the skelp are moved sidewise into position for alinement relative to said shear preparatory to the skelp clipping and cupping operation.

2. In apparatus for clipping and cupping pipe skelp, the combination of a shear having means for clipping and cupping the skelp, an alining mechanism whereby the skelp are held in alinement with said shear, a transfer mechanism whereby the skelp are moved sidewise into position for alinement relative to said shear preparatory to the skelp clipping and cupping operation, means for moving the skelp into alined position and a guide adapted to engage with and move the skelp endwise into position to be clipped and cupped during the sidewise movement of the skelp by said transfer mechanism.

3. In apparatus for clipping and cupping pipe skelp, the combination of a shear having means for clipping and cupping the skelp, an alining mechanism whereby the skelp are held in alinement with said shear, a transfer mechanism whereby the skelp are moved sidewise into position for alinement relative to said shear preparatory to the skelp clipping and cupping operation, means for moving the skelp into alined position, a guide adapted to engage with and move the skelp endwise into position to be clipped and cupped during the sidewise movement of the skelp by said transfer mechanism, and means on said transfer mechanism for moving the clipped and cupped skelp away from in front of said shear.

4. In apparatus for clipping and cupping pipe skelp, the combination of a shear having means for clipping and cupping the skelp, an alining mechanism whereby the skelp are moved into alinement with said shear, a transfer mechanism whereby the skelp are moved sidewise into position for alinement relative to said shear preparatory to the skelp clipping and cupping operation, a guide adapted to engage with and move the skelp endwise into position to be clipped and cupped during the sidewise movement of the skelp by said transfer mechanism, and a guide on said shear arranged to engage the upper surface of the skelp and limit the lifting movement of the skelp during the sidewise movement thereof by said transfer mechanism.

5. In apparatus for clipping and cupping pipe skelp, the combination with an end shear whereby the skelp are cut to length, and a second shear having means for clipping and cupping the sheared skelp, of means for automatically alining the skelp relative to said clipping and cupping shear, and a transfer mechanism for moving the sheared skelp sidewise from in front of said end shear into position to be engaged by said skelp alining means.

6. In apparatus for clipping and cupping pipe skelp, the combination with an end shear whereby the skelp are cut to length, and a second shear having means for clipping and cupping the sheared skelp, of means for automatically alining the skelp relative to said clipping and cupping shear, a transfer mechanism for moving the sheared skelp sidewise from in front of said end shear into position to be engaged by said kelp alining means, and means for moving the kelp lengthwise during the sidewise transfer thereof into position to be alined.

7. In apparatus for clipping and cupping pipe skelp, the combination with an end shear whereby the skelp are cut to length, and a second shear having means whereby the skelp are clipped and cupped, of a transfer mechanism for moving the skelp sidewise from said shear into position opposite said second shear, said transfer mechanism being arranged to remove the clipped and cupped skelp from in front of said shear, and means for automatically alining skelp positioned in front of said second shear preparatory to the clipping and cupping thereof.

8. In apparatus for clipping and cupping pipe skelp, the combination with an end shear whereby the skelp are cut to length, and a second shear having means whereby the skelp are clipped and cupped, of a transfer mechanism for moving the skelp sidewise from in front of said end shear into position in front of said second shear, a stop for alining skelp positioned in front of said second shear preparatory to the clipping and cupping thereof, and a counterweighted lever forming automatic means for yieldingly holding said skelp in engagement with said stop.

9. In apparatus for clipping and cupping pipe skelp, the combination with a shear having means whereby the ends of the skelp are clipped and cupped, of a reciprocatory transfer mechanism for moving the skelp sidewise into position in front of said shear, a stop for alining the skelp sidewise in front of the shear, and a counterweighted lever forming means for moving and yieldingly holding said skelp in contact with said stop in alining the skelp preparatory to the clipping and cupping operation.

10. In apparatus for clipping and cupping pipe skelp, the combination with an end shear whereby the skelp are cut to length, and a second shear whereby the skelp are clipped and cupped, of a transfer mechanism for moving the skelp sidewise from in front of said end shear into position in front of said clipping and cupping shear, a plurality of stops for alining the skelp sidewise in front of said clipping and cupping shear, and a plurality of counterweighted levers forming means for moving and yieldingly holding the skelp in contact with said stops in alining the skelp preparatory to the clipping and cupping operation.

11. In apparatus for clipping and cupping pipe skelp, the combination with an end shear whereby the skelp are cut to length, and a second shear whereby the skelp are clipped and cupped, of a transfer mechanism for moving the skelp sidewise from in front of said end shear into position in front of said clipping and cupping shear, a plurality of stops for alining the skelp sidewise in front of said clipping and cupping shear, a plurality of counterweighted levers forming means for moving and yieldingly holding the skelp in contact with said stops in alining the skelp preparatory to the clipping and cupping operation, and an inclined guide extending between the shears and arranged to engage with and move the sheared skelp lengthwise into clipping and cupping position during the sidewise movement of the skelp on said transfer mechanism.

In testimony whereof I have hereunto set my hand.

HOWARD D. COOK.

Copies of this patent may be obtained for five cents each, by addressing the "Commissioner of Patents, Washington, D. C."